United States Patent Office 2,992,063
Patented July 11, 1961

2,992,063
DYEING PROCESS FOR SYNTHETIC TEXTILE
MATERIALS
Harry Rose Hadfield, Walter Percival Mills, and Ronald Herbert Ricketts, Manchester, England, assignors to Imperial Chemical Industries Limited, London, England, a corporation of Great Britain
No Drawing. Filed Sept. 24, 1958, Ser. No. 762,910
Claims priority, application Great Britain Oct. 4, 1957
10 Claims. (Cl. 8—55)

The invention relates to a dyeing process and more particularly it relates to a dyeing process for synthetic polymeric materials.

According to the invention there is provided a process for dyeing synthetic polymeric materials which comprises treating the synthetic polymeric materials with an amine, phenol or a thiophenol, and with a water-insoluble reactive dyestuff, as hereinafter defined.

The process of the invention may be conveniently carried out by immersing the synthetic polymeric material in an aqueous solution or dispersion of the amine, phenol or thiophenol, heating for a period at a suitable temperature, for example 85° to 90° C., transferring the material to an aqueous dispersion of the water-insoluble reactive dyestuff and heating for a period, for example 60 minutes, at a suitable temperature, for example 95° to 100° C. The material is then removed from the dyebath, rinsed in water and dried.

Alternatively the synthetic polymeric material may be immersed in a dyebath containing both the amine, phenol or thiophenol and the water-insoluble reactive dyestuff, and the dyebath then heated to a suitable temperature, for example 90° to 100° C. to complete the dyeing process. The material is then removed from the dyebath, rinsed in water and dried.

Alternatively the treatment with the amine, phenol or thiophenol may be carried out in the dyebath by adding the amine, phenol or thiophenol to the dyebath after a proportion of the dye has been absorbed by the synthetic polymeric material.

It is preferred however to apply the water-insoluble reactive dyestuff to the synthetic polymeric material and subsequently treat the synthetic polymeric material containing the dyestuff with an amine, phenol or thiophenol.

According to a further feature of the invention therefore there is provided a process for dyeing synthetic polymeric materials which comprises applying a water-insoluble reactive dyestuff as hereinafter defined and subsequently treating the synthetic polymeric materials containing the dyestuff with an amine, phenol or thiophenol.

This process of the invention may be conveniently carried out by immersing the synthetic polymeric material in an aqueous dispersion of the water-insoluble reactive dyestuff, heating the dyebath for a period at a suitable temperature, for example 90° to 100° C., immersing the material in an aqueous solution or dispersion of the amine, phenol or thiophenol and heating for a period of a suitable temperature for example 90° to 100° C. The material is then removed from this solution or dispersion, rinsed in water and dried.

If desired the treatment of the synthetic polymeric material with the water-insoluble reactive dyestuff and the prior or after treatment in the aqueous solution or dispersion of the amine, phenol or thiophenol may be carried out under superatmospheric pressure, for example at a temperature of between 120° and 130° C.

When the synthetic polymeric material containing the dyestuff is aftertreated with an aqueous solution or dispersion of an amine, phenol or thiophenol then it is preferred to add a small quantity of an alkali, for example sodium carbonate, to the aqueous solution or dispersion of the amine, phenol or thiophenol.

The aqueous dispersion of a water-insoluble phenol or thiophenol may be conveniently obtained by dissolving the sodium salt of the phenol or thiophenol in water and subsequently precipitating the phenol or thiophenol by the addition of an acid, for example acetic acid. If desired a dispersing agent for example disodium methylene bis(naphthalene-2-sulphonate) may be added before the adition of the acid.

The aqueous dispersion of a water-insoluble amine may be conveniently obtained by dissolving a water-soluble salt of the amine, for example the hydrochloride, in water and precipitating the amine, if desired in the presence of a dispersing agent, by the addition of an alkali, for example sodium carbonate.

Alternatively the aqueous dispersion of a water-insoluble amine, phenol or thiophenol may be obtained by gravel-milling the amine, phenol or thiophenol in water, if desired in the presence of a dispering agent.

As examples of suitable amines, phenols or thiophenols which may be used in the processes of the invention there may be mentioned 2-hydroxydiphenyl, p-phenylene-diamine, hexamethylene-diamine, benzylamine, 4:4'-di-aminodiphenylmethane, ethylene-diamine, 2-mercapto-benzthiazole, dianisidine, benzidine, tetraethylene pent-amine, 4:4'-diaminobenzophenone, 2:7-diaminonaphtha-lene, 1:5-diphenyl biguanidine, 4:4'-diaminodiphenyl-sulphone, cyclohexylamine, 6-aminoindazole, 5:6-di-aminoindazole, 4:4'-dichloro-2-aminodiphenyloxide, 3:3'-diaminodiphenyl urea, 3:3'-diaminobenzophenone and 4:4'-diaminodibenzyl.

By the term "water-insoluble reactive dyestuff" there is meant a water-insoluble dyestuff containing at least one reactive halogen atom or other reactive atom or group, that is to say a halogen atom or other group capable of reacting with the amine, phenol or thiophenol. Examples of classes of such water-insoluble reactive dyestuffs include water-insoluble dyestuffs containing a S-triazinyl radical carrying one or two chlorine or bromine atoms directly attached to the triazine ring, water-insoluble dyestuffs containing a pyrimidyl radical carrying one or two chlorine or bromine atoms directly attached to the pyrimidine ring, water-insoluble dyestuffs containing at least one γ-halogeno-β-hydroxypropylamine group, water-insoluble dyestuffs containing at least one di-(γ-halogeno-β-hydroxy-propyl)amino group, water-insoluble dyestuffs containing at least one β-halogenoethyl-sulphamyl group, water-insoluble dyestuffs containing at least one β-halogenoethoxy group, water-insoluble dyestuffs containing at least one β-halogenothioethane group, water-insoluble dyestuffs containing at least one γ-halo-geno-β-hydroxypropylsulphamyl group, water-insoluble dyestuffs containing at least one chloracetylamino group, water-insoluble dyestuffs containing at least one vinyl-sulphonyl group and water-insoluble dyestuffs containing at least one epoxy propyl group. The dyestuffs in these classes may be for example nitro dyestuffs or dyestuffs of the azo, anthraquinone or phthalocyanine series which are insoluble in water.

Suitable water-insoluble dyestuffs containing a dichloro or dibromo-s-triazinyl radical may be obtained by reacting one molecular proportion of a water-insoluble dyestuff containing a primary amino or secondary amino group with one molecular proportion of cyanuric chloride or cyanuric bromide. Suitable water-insoluble dyestuffs containing a monochloro- or monobromo-s-triaz-inyl radical may be obtained by reacting one molecular proportion of a water-insoluble dyestuff containing a primary amino or secondary amino group with one molecular proportion of a triazine of the formula:

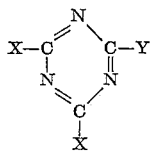

wherein X is a chlorine or bromine atom and Y stands for an alkyl, aryl, amino or for an organic radical containing a nitrogen, oxygen or sulphur atom through which it is linked to the triazine ring.

Suitable water-insoluble dyestuffs containing a pyrimidyl radical carrying one or two chlorine or bromine atoms directly attached to the pyrimidine ring may be obtained by interacting substantially equimolecular proportions of a water-insoluble dyestuff containing a primary amino or secondary amino group and a pyrimidine containing at least two chlorine or bromine atoms in the 2, 4 or 6 positions of the pyrimidine ring. As examples of suitable pyrimidines there may be mentioned:

2:4:6-trichloropyrimidine,
2:5-dibromopyrimidine,
2:4-dichloro-6-methylpyrimidine,
2:4-dichloro-6-methoxypyrimidine,
2:4-dichloro-6-phenylpyrimidine,
2:4-dichloro-6-nitropyrimidine,
2:4-dichloro-6-hydroxypyrimidine,
2:4:6-trichloro-5-nitropyrimidine and
2:4-dichloro-5-nitro-6-methylpyrimidine.

Suitable water-insoluble dyestuffs containing at least one $\gamma$-halogeno-$\beta$-hydroxypropylsulphamyl or $\beta$-halogenoethylsulphamyl group may be obtained by treating a water-insoluble dyestuff containing at least one sulphonchloride group with a $\gamma$-halogeno-$\beta$-hydroxypropylamine or a $\beta$-halogenoethylamine respectively.

Suitable water-insoluble dyestuffs containing at least one $\beta$-halogenoethoxy or $\beta$-halogenothioethane group may be obtained by treating a water-insoluble dyestuff containing at least one $\beta$-hydroxyethoxy or $\beta$-hydroxythioethane group with a halogenating agent.

Suitable water-insoluble dyestuffs containing at least one $\gamma$-halogeno-$\beta$-hydroxypropylamino or di-($\gamma$-halogeno-$\beta$-hydroxypropyl)amino group may be obtained by reacting a water-insoluble dyestuff containing one or more primary amino groups with epichlorohydrin and separating the mixture of products so obtained.

Suitable water-insoluble dyestuffs containing a propylepoxy group may be obtained by reacting the corresponding dyestuffs containing a $\gamma$-chloro-$\beta$-hydroxypropyl group with potassium hydroxide.

Suitable water-insoluble dyestuffs containing a vinylsulphone group may be obtained by treating with an alkali, for example potassium hydroxide, the corresponding dyestuffs containing a $\beta$-sulphatoethylsulphonyl group which may themselves be obtained by sulphating the corresponding dyestuffs containing a $\beta$-hydroxyethyl group.

Suitable water-insoluble dyestuffs containing at least one chloracetylamino group may be obtained by treating the corresponding dyestuff containing at least one amino group with chloracetyl chloride.

As specific examples of suitable water-insoluble reactive dyestuffs which may be used in the processes of the invention there may be mentioned 2-hydroxy - 5 - methyl-4'-(4'':6''-dichloro-1'':3'':5''-triazin-2''-ylamino)azobenzene, 2-chloro - 4 - ethanesulphonyl-4'-N-$\beta$-hydroxyethyl-N-$\beta$-4'':6''-dichloro-1'':3'':5''-triazin - 2''-ylamino) - ethylaminoazobenzene, 4 - (4'':6''- dichloro - 1'':3'':5''- triazin - 2''-ylamino)- 2-methylazobenzene, 2-hydroxy - 5 - methyl-4'-(4''':6''-dibromo-1'':3'':5''-triazin-2''-ylamino)azobenzene, 2-hydroxy - 5 - methyl - 4'-(4''-chloro-6''-$\beta$-hydroxyethylamino-1'':3'':5''-triazin-2''-ylamino)azobenzene, 2 - hydroxy - 5 - methyl - 4'-(4''-chloro-6''-anilino-1'':3'':5''-triazin-2''-ylamino)azobenzene, 2-hydroxy - 5 - methyl-4'-(4''-chloro-6''-amino-1'':3'':5''-triazin-2''-ylamino)azobenzene, 2-chloro - 4 - ethanesulphonyl - 4'-N-$\beta$-hydroxyethyl-N-$\beta$-(4''-chloro-6''-hydroxy-1'':3'':5''- triazin-2''-ylamino)-ethylaminoazobenzene, 2 - hydroxy - 5 - methyl - 4'-(4''-bromo-6''-N:N-di($\beta$-hydroxyethyl)amino-1'':3'':5''- triazin - 2''- ylamino)azobenzene, 2 - hydroxy - 5 - methyl - 4'-(4''-chloro-6''-phenyl-1'':3'': 5''-triazin-2''-ylamino)azobenzene, 4-amino-4'-(4''-chloro - 6''-phenoxy-1'':3'':5''-triazin-2''-ylamino)azobenzene, 1-4'-(4''':6''-dichloro-1'':3'':5''- triazin - 2''- ylamino)anilinoanthraquinone, 1,4'-(4''- chloro - 6''-phenoxy - 1'':3'':5''-triazin - 2''-ylamino)anilinoanthraquinone, 4'-(4''-6''-dichloro - 1'':3'':5''- triazin - 2''-ylamino)-2:4-dinitrodiphenylamine, 4'- (4''-chloro-6''- methoxytriazin - 2''- ylamino)2:4-dinitrodiphenylamine, 3'-(4''-chloro-6''-phenoxy - 1'':3'':5''-triazin-2''-ylamino)-2-nitro-4-trifluoromethyldiphenylamine, 2-hydroxy - 5 - methyl-4'-(4''':6''-dichloro-pyrimidine-2''-ylamino)azobenzene, 4'-nitro-4-N:N-di -($\gamma$-chloro-$\beta$-hydroxypropyl)amino-azobenzene, 1:4-bis($\gamma$ - chloro-$\beta$-hydroxypropylamino)anthraquinone, 4'-$\beta$-chloroethylsulphamylphenylazo-4 - $\beta$ - hydroxyethylaminonaphthalene, 4-$\beta$-chloroethylsulphamyl-2'- methyl - 5'- N-ethyl-N-$\beta$-hydroxyethylaminoazobenzene, 2-chloro-4-$\beta$-chloroethylsulphamyl - 2'-methyl-5'-di(beta-hydroxyethyl)aminoazobenzene, 1-methylamino-4-$\beta$-chloroethylamino-anthraquinone, 1:4'- (4'':6''- dichloro - 1'':3'':5''- triazin - 2 - ylamino)-phenylazo-2-naphthol, 1-amino-2-$\beta$-bromoethoxy-4-hydroxyanthraquinone, 1-amino-4-hydroxy- 2 -$\beta$-($\beta'$- chloroethoxy)ethoxyanthraquinone and 1-amino-4-hydroxy- 2 -$\beta$-($\beta'$- bromoethoxy)ethoxyanthraquinone.

As examples of suitable synthetic polymeric materials which may be dyed by the processes of the invention there may be mentioned synthetic polyamides, for example polyhexamethyleneadipamide, synthetic polyesters, for example polyethyleneterephthalate, acetate rayon, cellulose triacetate, synthetic polyacrylonitrile fibres and fibres made from insoluble polyvinyl alcohol.

By the processes of the invention there may be obtained on synthetic polymeric materials a wide range of shades which have excellent fastness to washing and to dry heat treatment.

The invention is illustrated but not limited by the following examples in which the parts are by weight:

*Example 1*

1 part of 2-hydroxy-5-methyl-4'-(4''-chloro-6''-di($\beta$-hydroxyethyl)amino-1'':3'':5''- triazin - 2''-ylamino)azobenzene is dispersed in 20 parts of water and the dispersion so obtained is added to 4,000 parts of water containing 4 parts of the condensate of ethylene oxide with a fatty alcohol. 100 parts of polyhexamethyleneadipamide fabric are placed in the dyebath thus obtained which is then heated to 95° C. and maintained at this temperature for 60 minutes. The dyed fabric is then rinsed in water. The fabric containing the dyestuff is then heated for 45 minutes at 85° C. in a solution of 4 parts of ethylene diamine and 4 parts sodium carbonate in 4,000 parts of water. The fabric is then rinsed in cold water and dried. The polyhexamethyleneadipamide fabric is coloured a yellow shade possessing superior wash and heat fastness properties to fabric which was dyed but not after-treated in the aqueous solution of ethylenediamine.

In place of the 4 parts of ethylenediamine used in the above example there may be used 4 parts of cyclohexylamine or 4 parts of dianisidine or 4 parts of benzylamine or 4 parts of 4:4'-diaminodiphenylsulphone or 4 parts of phenylbiguanide or 4 parts of tetraethylene pentamine when yellow shades possessing similar fastness properties are obtained.

*Example 2*

1 part of 4'-nitrophenyl-4-N:N-di(gamma-chloro-beta-hydroxy-propyl)aminoazobenzene is dispersed in 20 parts of water and the dispersion so obtained is added to 4,000 parts of water containing 4 parts of the condensate of ethylene oxide with a fatty alcohol and 4 parts of hexamethylene diamine. 100 parts of polyhexamethyleneadipamide fabric are placed in the dyebath thus obtained which is heated to 85° C. and maintained at this temperature for 60 minutes. The fabric is rinsed in water, then treated at 85° C. in an aqueous solution containing 0.1%–0.2% of a condensate of ethylene oxide with an alkyl phenol and 0.2% of soda ash. The dyed fabric is finally rinsed in water and dried. The polyhexamethylene fabric is dyed a red shade possessing very good fastness to wet and dry heat treatments.

*Example 3*

100 parts of polyhexamethylenedipamide fabric are heated in 4,000 parts water containing 4 parts hexamethylene diamine for one hour at 85° C. The fabric is then transferred, without rinsing, to a dye bath prepared by dispersing 1 part of 1:4-di(beta-hydroxy-gamma-chloropropylamino)anthraquinone in 20 parts of water and adding the dispersion so obtained to 4,000 parts of water containing 4 parts of the condensate of ethylene oxide with a fatty alcohol at a temperature of 50–60° C. The dyebath is then heated at 85° C. for 60 minutes and the dyed polyhexamethyleneadipamide fabric is rinsed in water and dried.

The polyhexamethyleneadipamide fabric is dyed a blue shade possessing very good fastness to wet and dry heat treatments.

*Example 4*

1 part of 2-hydroxy-5-methyl-4'-(4''-chloro-6''-di(β-hydroxyethyl)amino-1'':3'':5''-triazin-2'' - ylamino)azobenzene is dispersed in 20 parts of water and the dispersion so obtained is added to 4,000 parts of water containing 4 parts of a condensate of ethylene oxide with a fatty alcohol. 100 parts of polyhexamethyleneadipamide fibre are placed in the dyebath thus obtained, which is heated to 85° C. and maintained at this temperature for 60 minutes. 2 parts of hexamethylene diamine are then added and the heating is continued for a further 60 minutes at the same temperature. The dyed fibre is then rinsed in water and dried. The fibre is dyed a yellow shade.

*Example 5*

1 part of 4'-nitrophenyl-4-N:N-di(γ-chloro-β-hydroxy-propyl)aminoazobenzene is dispersed in 20 parts of water and the dispersion so obtained is added to 4,000 parts of water containing 4 parts of the condensate of ethylene oxide with a fatty alcohol. 100 parts of acetate rayon are immersed in the dyebath so obtained which is heated to 85° C. and maintained at this temperature for 60 minutes, after which the acetate rayon is removed from the dyebath and rinsed in water. The acetate rayon containing the dyestuff is then treated for 1 hour in a bath consisting of 4,000 parts of water, 1 part of sodium carbonate, 40 parts sodium chloride and 4 parts 4:4'-diamino-diphenylmethane (previously dispersed in water with 1 part of the disodium salt of methylene bis-naphthyl sulphonic acid), which is heated at 85° C. The dyed acetate rayon is then rinsed in cold water and dried. The acetate rayon is dyed a red shade possessing much better fastness to wet and dry heat treatments than a similar dyeing which was not after treated in a bath containing 4:4'-diaminodiphenylmethane.

*Example 6*

1 part of 1:4-di(β-hydroxy-γ-chloropropylamino)anthraquinone is dispersed in 20 parts of water and the dispersion so obtained is added to 4,000 parts of water containing 1.5 parts of oleyl sodium sulphate. 100 parts of polyethylene terephthalate fibre are immersed in the dyebath so obtained, which is then heated to 85° C. and 6 parts of diphenyl (emulsified with oleyl sodium sulphate) are added. The temperature of the dyebath is then raised to between 98 and 100° C. and maintained at this temperature for 90 minutes. The dyed fibre is then rinsed in water and immersed in a bath prepared by adding 3 parts of oleyl sodium sulphate and 12 parts of sodium o-phenyl phenate to 4,000 parts of water at 70° C. and adjusting the pH of the bath to 7 by the addition of acetic acid. The bath is heated to between 98 and 100° C. and maintained at this temperature for 60 minutes. The dyed fabric is then rinsed in water and finally rinsed for 15 minutes in a solution of 0.5 part of oleyl sodium sulphate in 1,000 parts water, which is heated at 75° C. The polyethyleneterephthalate fabric is dyed a blue shade and the fastness to wet and dry heat treatments is substantially greater than a similar dyeing which was not aftertreated in a bath containing o-phenyl phenol.

*Example 7*

In place of the 1 part of 2-hydroxy-5-methyl-4'-(4''-chloro - 6''-di(β-hydroxyethyl)amino - 1'':3'':5''-triazin-2''-ylamino)azobenzene used in Example 1 there is used 1 part of 4-(4'-β-chloroethylsulphamylphenylazo)-1-β-hydroxyethylamino naphthalene. The polyhexamethylenedipamide material is coloured a red shade possessing excellent wash fastness properties.

*Example 8*

In place of the 1 part of 2-hydroxy-5-methyl-4'-(4''-chloro - 6''-di(β-hydroxyethyl)amino - 1'':3'':5''-triazin-2''-ylamino)azobenzene used in Example 1 there is used 1 part of 2-methyl-4-N-ethyl-N-β-hydroxyethylamino-4'-β-chloroethylsulphamyl azobenzene. The polyhexamethylenedipamide material is coloured an orange shade possessing excellent wash fastness properties.

*Example 9*

In place of the 1 part of 2-hydroxy-5-methyl-4'-(4-chloro-6-di(β-hydroxyethyl)amino-1:3:5-triazin-2 - ylamino)azobenzene used in Example 1 there are used 2 parts of 1-amino-2-β-bromoethoxy-4 - hydroxyanthraquinone. The polyhexamethyleneadipamide material is coloured a red shade possessing excellent wash fastness properties.

*Example 10*

In place of the 1 part of 2-hydroxy-5-methyl-4'-(4''-chloro - 6''-di(β-hydroxyethyl)amino - 1'':3'':5''-triazin-2''-ylamino)azobenzene used in Example 1 there is used 1 part of 2-methyl-2'-trifluoromethyl-4-di(γ-chloro-β-hydroxypropyl)amino-4'-cyano-5-methoxyazobenzene. The polyhexamethyleneadipamide material is coloured a red shade possessing excellent fastness to washing.

*Example 11*

In place of the 1 part of 2-hydroxy-5-methyl-4'-(4''-chloro-6''-di(β-hydroxyethyl)amino-1'':3'':5''-triazin-2''-ylamino)azobenzene used in Example 1 there are used 2 parts of 4 - N - β - hydroxyethyl-N-β-(4'':6''-dichloro-1'':3'':5''-triazin-2''-ylamino)ethylamino - 4' - methylsulphonylazobenzene. The polyhexamethyleneadipamide is dyed an orange shade possessing excellent fastness to washing.

Example 12

In place of the 1 part of 2-hydroxy-5-methyl-4'-(4''-chloro - 6'' - di(β-hydroxyethyl)amino-1'':3'':5''-triazin-2''-ylamino)azobenzene used in Example 1 there is used 1 part of 1-β-chloroethylamino-4-methylaminoanthraquinone. The polyhexamethyleneadipamide is dyed a blue shade possessing excellent fastness to washing.

Example 13

In place of the 1 part of 2-hydroxy-5-methyl-4'-(4''-chloro - 6'' - di(β-hydroxyethyl)amino-1'':3'':5''-triazin-2''-ylamino)azobenzene used in Example 1 there are used 2 parts of 1-[4'-(4'':6''-dichloro-1'':3'':5''-triazin-2''-ylamino)phenyl-azo]-2-naphthol. The polyhexamethyleneadipamide is dyed a red shade possessing excellent fastness to washing.

Example 14

In place of the 1 part of 2-hydroxy-5-methyl-4'-(4''-chloro - 6'' - di(β-hydroxyethyl)amino-1'':3'':5''-triazin-2''-ylamino)azobenzene used in Example 1 there are used 2 parts of 1-[4'-(4''-chloro-6''-di(β-hydroxyethyl)amino-1'':3'':5''-triazin-2''-ylamino)phenylazo] - 2 - naphthol. The polyhexamethyleneadipamide material is dyed a red shade possessing excellent fastness to washing.

Example 15

In place of the 1 part of 2-hydroxy-5-methyl-4'-(4''-chloro - 6'' - di(β-hydroxyethyl)amino-1'':3'':5''-triazin-2''-ylamino)azobenzene used in Example 1 there is used 1 part of 2-hydroxy-5-methyl-4'-(4'':6''-dichloropyrimidin-2''-ylamino)azobenzene. The polyhexamethyleneadipamide material is dyed a yellow shade possessing excellent fastness to washing.

Example 16

1 part of 2-hydroxy-5-methyl-4'-(2''-chloro-5''-nitro-6''-methylpyrimidin-4''-ylamino)azobenzene is dispersed with 5 parts of oleyl sodium sulphate in 5,000 parts of water. 100 parts of polyethylene terephthalate fibre are then added to the dyebath so obtained and dyeing is carried out for 1 hour at 130° C. under superatmospheric pressure. The fibre is removed from the dyebath and rinsed in water. The fibre is then treated for 1 hour at 130° C. under superatmospheric pressure in a bath comprising a dispersion of 10 parts of 6-aminoindazole in 5,000 parts of water containing 2.5 parts of oleyl sodium sulphate. The fibre is removed from the bath, rinsed in water and heated for 15 minutes at 60° C. in a solution of 10 parts of sodium hydroxide, 10 parts of sodium hydrosulphite and 2 parts of cetyl trimethylammonium bromide in 5,000 parts of water. The fibre is finally rinsed in water and dried. The fibre is dyed a yellow shade possessing excellent wash fastness properties.

Example 17

In place of the 10 parts of 6-aminoindazole used in Example 16 there are used 5 parts of pyridine. The fibre is dyed a yellow shade possessing excellent fastness properties.

Example 18

1 part of 4-beta-chloroethylsulphamyl-2'-methyl-4'-di-(beta-hydroxyethyl)aminoazobenzene is dispersed in 20 parts of water and the dispersion so obtained is added to 4,000 parts of water containing 4 parts of the condensate of ethylene oxide with a fatty alcohol. 100 parts of acetate rayon fabric are placed in the dyebath so obtained which is then heated to 85° C. and maintained at this temperature for 60 minutes. The dyed fabric is then removed from the dyebath and rinsed in water. The acetate rayon fabric containing the dyestuff is then treated for 1 hour at 85° C. in a bath consisting of 4,000 parts water, 4 parts of the condensate of ethylene oxide with a fatty alcohol and 5 parts of N-(p-aminobenzenesulphon)-N-methylglucosamine. The fabric is then rinsed in water and dried. The acetate rayon fabric is coloured an orange shade possessing much better fastness properties to wet and heat treatments than acetate rayon fabric which was dyed but not after-treated in the aqueous solution containing N-(p-aminobenzenesulphon)-N-methylglucosamine.

In place of the 5 parts of N-(p-aminobenzenesulphon)-N-methylglucosamine used in the above example there may be used 5 parts of 1-acetamido-3-diethylaminopropan -2-ol or 5 parts of 3-aminobenz-n-butylamide or 5 parts of N:N'-di(p-aminobenzoyl) ethylenediamine when orange shades possessing similar fastness properties are obtained.

Example 19

In place of the 1 part of 4-beta-chloroethylsulphamyl-2'-methyl - 4' - di-(beta-hydroxyethyl)aminoazobenzene used in Example 18 there is used 1 part of 2-hydroxy-5-methyl-4'-(4'''-chloro-6''-di - (beta-hydroxyethyl)amino-1'':3'':5''-triazin-2''-ylamino)azobenzene and in place of the 5 parts of N-(p-aminobenzenesulphon)-N-methylglucosamine there are used 5 parts of beta-phenylacetamidoethylamine. The acetate rayon fabric is coloured a yellow shade possessing much better wet fastness properties than acetate rayon fabric which was dyed but not after-treated in the aqueous solution containing beta-phenylacetamidoethylamine.

Example 20

In place of the 1 part of 4-beta-chloroethylsulphamyl-2'-methyl-4'-di-(beta-hydroxyethyl)aminoazobenzene used in Example 18 there is used 1 part of 1:4-di(beta-hydroxy-gamma-chloro-propylamino)anthraquinone and in place of the 5 parts of N-(p-aminobenzenesulphon)-N-methylglucosamine there are used 5 parts of 11-amino-1-caprylamido-3:6:9-triazaundecane. The acetate rayon fabric is coloured a blue shade possessing much better wet fastness properties than acetate rayon fabric which has been dyed but not after-treated in the aqueous solution containing 11-amino-1-caprylamido-3:6:9-triazaundecane.

What we claim is:

1. A process for dyeing synthetic textile materials, composed of a polymer selected from the group consisting of polyamides, polyesters, acetate rayon, cellulose triacetate, polyacrylonitriles and insoluble polyvinyl alcohol, which consists essentially in treating said textile materials in an aqueous medium with a water-insoluble reactive dyestuff and thereafter treating the material with an agent, selected from the group consisting of primary and secondary amines, a phenol, and a thiophenol, and reacting said agent with said dyestuff on said textile material to form a derivative of said dyestuff respectively selected from the group consisting of an amino derivative, a phenoxy derivative and a thiophenoxy derivative.

2. Process as claimed in claim 1 wherein the treatment of said textile material with said agent is carried out in the presence of an alkali.

3. Process as claimed in claim 2 wherein the alkali is sodium carbonate.

4. Process as claimed in claim 1 wherein said water-insoluble reactive dyestuff is a water-insoluble dyestuff which contains at least one gamma-halogeno-beta-hydroxypropylamino group.

5. Process as claimed in claim 1 wherein said water-insoluble reactive dyestuff is a water-insoluble dyestuff which contains at least one halogenoalkylsulphamyl group.

6. Process as claimed in claim 1 wherein said water-insoluble reactive dyestuff is a water-insoluble dyestuff which contains at least one radical selected from the group consisting of mono- and dihalogeno-1:3:5-triazin-2-ylamino groups.

7. Process as claimed in claim 1 wherein said water-insoluble reactive dyestuff is a water-insoluble dyestuff which contains at least one halogenoalkoxy group.

8. Process as claimed in claim 1 wherein said water-insoluble reactive dyestuff is a water-insoluble dyestuff which contains at least one halogenoalkylamino group.

9. Process as claimed in claim 1 wherein said water-insoluble reactive dyestuff is a water-insoluble dyestuff which contains at least one epoxyalkyl group.

10. Process as claimed in claim 1 wherein said water-insoluble reactive dyestuff is a water-insoluble dyestuff which contains at least one di(gamma-halogeno-beta-hydroxypropyl)amino group.

References Cited in the file of this patent

UNITED STATES PATENTS

| | | |
|---|---|---|
| 2,258,977 | Dickey | Oct. 14, 1941 |
| 2,895,785 | Alsberg | July 21, 1959 |